(12) United States Patent
Liang et al.

(10) Patent No.: US 7,413,159 B2
(45) Date of Patent: Aug. 19, 2008

(54) STAND FOR RETAINING COMPUTER CHASSIS

(75) Inventors: Chun-Chi Liang, Guangdong (CN); Pin-Shian Wu, Guangdong (CN); Ji-Guo Xu, Guangdong (CN)

(73) Assignees: Hong Fu Jin Precision Industry (Shen Zhen) Co., Ltd., Shenzhen (CN); Hon Hai Precision Industry Co., Ltd., Tu-Cheng (TW)

( * ) Notice: Subject to any disclaimer, the term of this patent is extended or adjusted under 35 U.S.C. 154(b) by 142 days.

(21) Appl. No.: 11/306,484

(22) Filed: Dec. 29, 2005

(65) Prior Publication Data
US 2007/0040079 A1    Feb. 22, 2007

(30) Foreign Application Priority Data
Aug. 5, 2005    (CN)    ............... 2005 2 0062677

(51) Int. Cl.
*F16M 3/00* (2006.01)
(52) U.S. Cl. ............... 248/676; 248/146; 248/175; 248/346.03; 248/676; 248/918
(58) Field of Classification Search ............... 248/146, 248/346.01, 676, 678, 175, 176.3, 346.03, 248/291.1, 284.1, 292.12, 918; 403/113, 403/116, 117, 119, 62, 65, 73, 150, 330; 297/16.1, DIG. 11; 361/679, 683
See application file for complete search history.

(56) References Cited

U.S. PATENT DOCUMENTS

| 3,936,022 | A | * | 2/1976 | Nicholl | ............... 248/137 |
|---|---|---|---|---|---|
| 4,553,786 | A | * | 11/1985 | Lockett et al. | ............ 297/440.1 |
| D298,376 | S | * | 11/1988 | Patten | ............... D34/31 |
| 5,246,410 | A | * | 9/1993 | Fun | ............... 482/53 |
| 5,507,564 | A | * | 4/1996 | Huang | ............ 297/452.13 |
| 5,527,253 | A | * | 6/1996 | Wilkinson et al. | ............ 482/147 |
| 5,794,913 | A |  | 8/1998 | Ho |  |
| 5,982,885 | A | * | 11/1999 | Ho | ............... 379/446 |
| 6,311,941 | B1 |  | 11/2001 | Feldmeyer |  |
| 6,364,278 | B1 |  | 4/2002 | Lin et al. |  |
| 6,739,649 | B2 | * | 5/2004 | Kelly et al. | ............ 297/16.1 |
| 6,802,328 | B2 | * | 10/2004 | Lin | ............... 135/96 |
| 6,902,230 | B2 | * | 6/2005 | Chen | ............ 297/16.1 |
| 6,929,337 | B2 | * | 8/2005 | Helot et al. | ............ 312/223.2 |
| 2006/0158010 | A1 | * | 7/2006 | Hsieh | ............ 297/16.1 |
| 2006/0289719 | A1 | * | 12/2006 | Liang et al. | ............ 248/676 |
| 2007/0001085 | A1 | * | 1/2007 | Liang et al. | ............ 248/678 |

* cited by examiner

*Primary Examiner*—Korie H. Chan
(74) *Attorney, Agent, or Firm*—Winston Hsu

(57) ABSTRACT

A stand for supporting a computer chassis (100) includes a base frame (10), a pair of clamping arms (20), and a hinge (3) pivotally connecting the clamping arms to the base frame. The base frame includes a pair of levers (12), and a beam (14) disposed between the levers. The hinge includes a pair of first connecting portion (30), a pair of second connecting portions (40) assembled with first connecting portions, and a shaft (50) pivotally engaging with the first and second connecting portions. The first connecting portions respectively hold free ends of the levers of the base frame therein. The second connecting portions respectively hold free ends of the clamping arms therein. The computer chassis is supported by the stand, seating on the shaft and the beam of the base frame and retained by the clamping arms.

14 Claims, 4 Drawing Sheets

STAND FOR RETAINING COMPUTER CHASSIS

FIELD OF THE INVENTION

The present invention relates to stands, and particularly to a stand which can freely and stably support computer chassis with different sizes.

DESCRIPTION OF RELATED ART

Conventional desktop computer enclosures are usually classified as tower computer enclosures and horizontal computer enclosures. Due to a compact size trend of the development of computer enclosures, horizontal computer enclosures are made much thinner than before. To enable a horizontal computer enclosure to stand like a tower computer enclosure, a supporting apparatus, such as a pedestal is needed.

A conventional stand is often secured to a bottom of a computer chassis via a plurality of screws. However, using extra tools to screw or unscrew the screws makes the assembly or disassembly process unduly cumbersome.

Another conventional stand such as disclosed in U.S. Pat. No. 6,364,278, includes two coupled supporting members. Each supporting member includes a dove-tail shaped protrusion to couple with a recess of the other supporting member. This structure is simple and readily to be assembled. However, a clamping ledge is integrally formed from each supporting member. Therefore, the stand only engages a part of a lower portion of the computer chassis. When the computer chassis has a great height, the stand may not stably support the computer chassis.

What is desired, therefore, is a stand stably and freely supporting computer chassis with different sizes.

SUMMARY OF INVENTION

In one preferred embodiment, a stand for supporting a computer chassis includes a base frame, a pair of clamping arms, and a hinge pivotally connecting the clamping arms to the base frame. The base frame includes a pair of levers, and a beam disposed between the levers. The hinge includes a pair of first connecting portion, a pair of second connecting portions assembled with first connecting portions, and a shaft pivotally engaging with the first and second connecting portions. The first connecting portions respectively hold free ends of the levers of the base frame therein. The second connecting portions respectively hold free ends of the clamping arms therein. The computer chassis is supported by the stand, seating on the shaft and the beam of the base frame and retained by the clamping arms.

Other advantages and novel features will become more apparent from the following detailed description of preferred embodiments when taken in conjunction with the accompanying drawings, in which:

DETAILED DESCRIPTION

Figure 1:
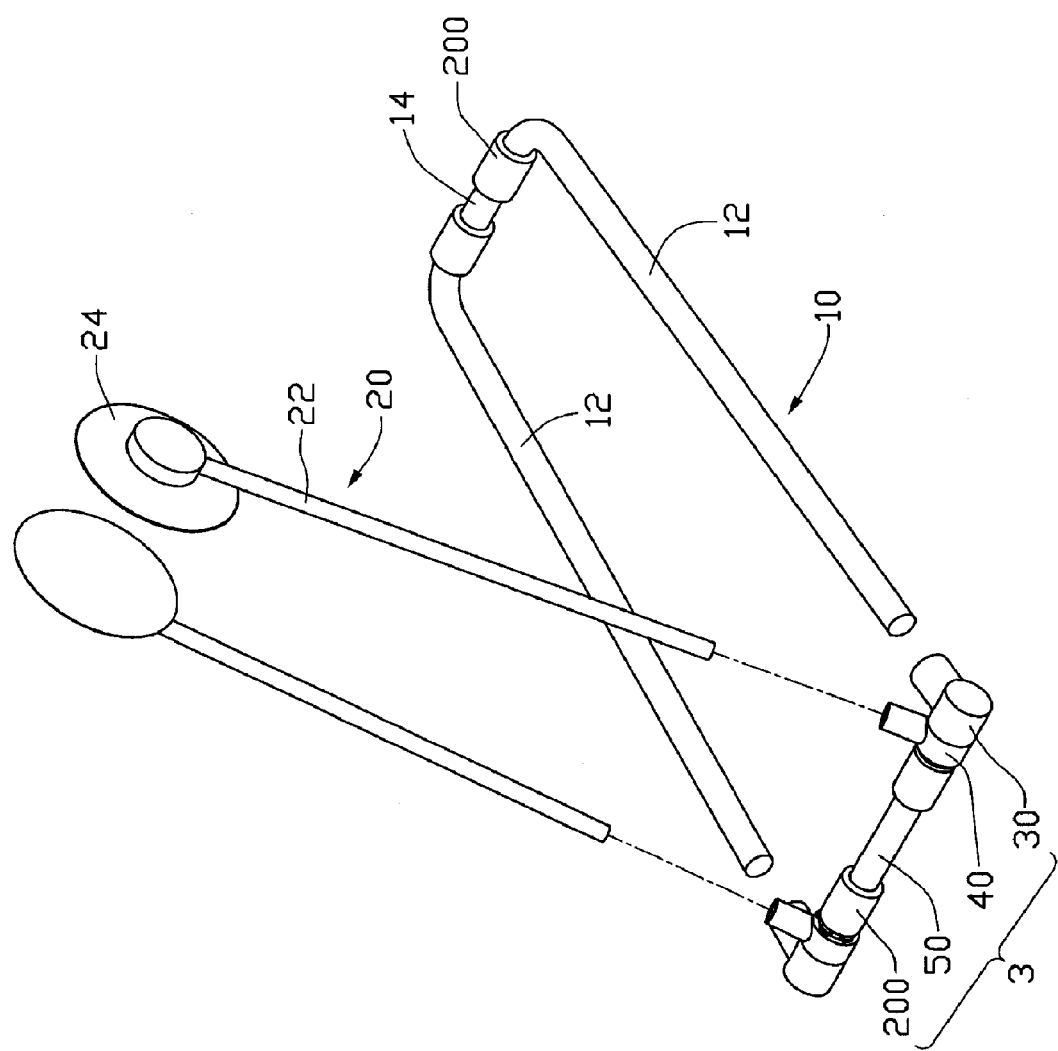
FIG. 1 is an exploded, isometric view of a stand in accordance with a preferred embodiment of the present invention.

Referring to FIG. 1, a stand in accordance with a preferred embodiment of the present invention corporately supports a computer chassis 100 and includes a base frame 10, a pair of clamping arms 20, and a hinge 3 pivotally connecting the clamping arms 20 to the base frame 10.

The base frame 10 has a U-shaped configuration. The base frame 10 includes a pair of levers 12, and a beam 14. The beam 14 is perpendicularly disposed between ends of the levers 12.

Each clamping arm 20 includes a pole 22, and a retaining pad 24 arranged at an end of the pole 22. The retaining pads 24 are for engaging sides of the computer chassis 100 and sandwich the computer chassis 100 therebetwen. In this preferred embodiment, the retaining pads 24 are circular rubber suckers.

Figure 2:
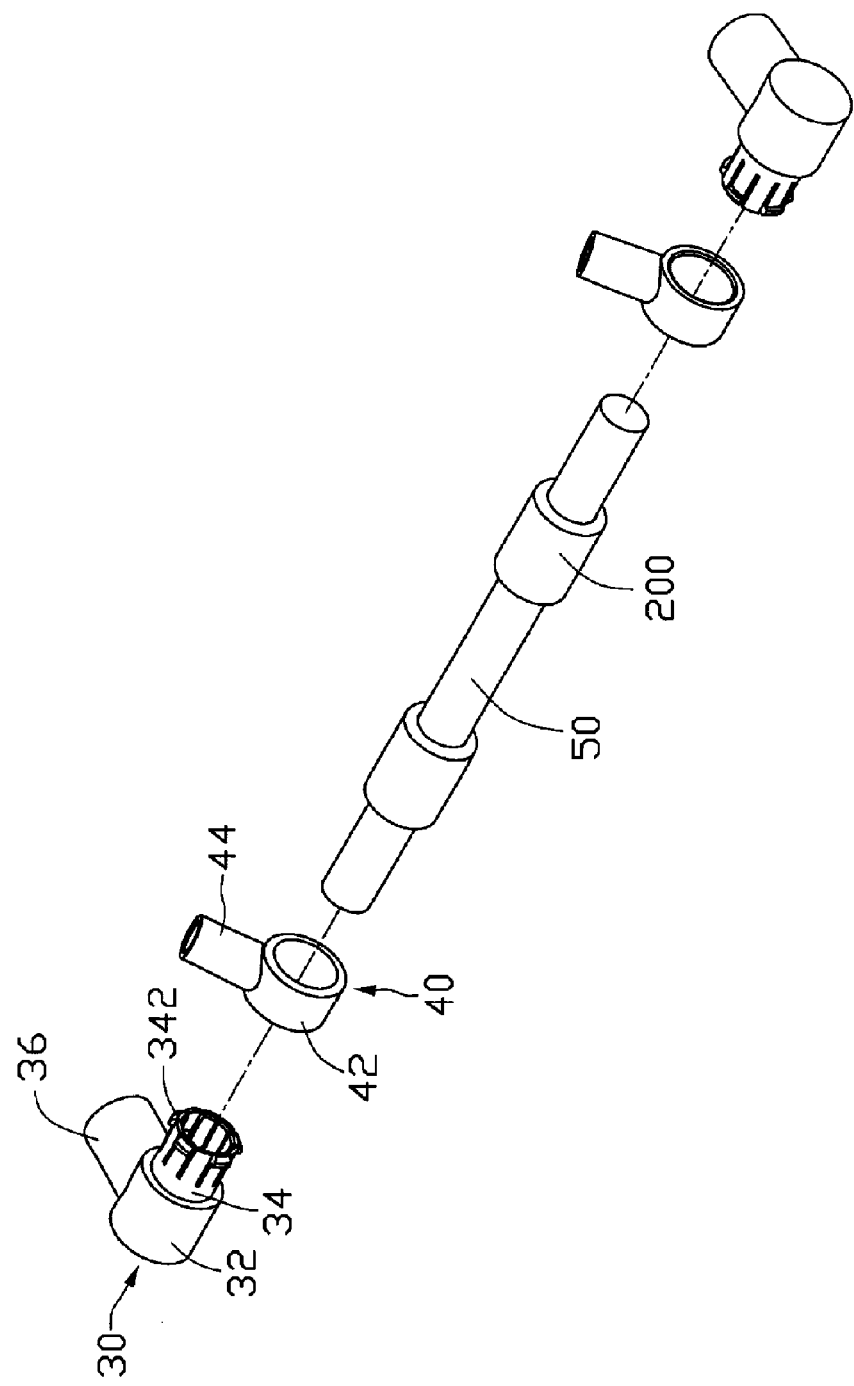
FIG. 2 is an exploded, enlarged view of a hinge of the stand of FIG. 1.

Referring to FIG. 2, the hinge 3 includes a pair of first connecting portions 30, a pair of second connecting portions 40, and a shaft 50 pivotally engaging with the first connects 30 and the second connecting portions 40.

Each of the first connecting portions 30 includes a sleeve 32, a collar 34 extending from an end of the sleeve 32, and a tube 36 extending from an outer circumferential surface of the sleeve 32. An axis of each sleeve 32 is generally perpendicular to that of each tube 36 and is coaxial to that of each collar 34. Each tube 36 is for receiving a free end of a corresponding lever 12 of the base frame 10. Each collar 34 includes a plurality of catches 342 formed in a free end thereof.

Each of second connecting portions 40 includes a sleeve 42, and a tube 44 extending from an outer circumferential surface of the sleeve 42. An axis of the sleeve 42 is generally perpendicular to that of the tube 44. The sleeves 42 engage with the catches 342 of the first connecting portions 30 and pivotally receive the shaft 50 therein. Each of the tubes 44 is for receiving a free end of the corresponding pole 22 of each clamping arm 20.

A plurality of bushes 200 is separately fixed around the shaft 50 of the hinge 3 and the beam 14 of the base frame 10. The bushes 200 are made of rubber, for preventing a bottom of the computer chassis 100 being scraped and unwillingly moving on stand.

In assembly, the first connecting portions 30 are assembled to the second connecting portions 40, with the collars 34 extending into the sleeves 42 of the second connecting portions 40 and the catches 342 engaging with free ends of the corresponding sleeves 42 of the second connecting portions 40. Two ends of the shaft 50 extended into collars 34 and the sleeves 32 of the first connecting portions 30. Free ends of the poles 22 of the clamping arms 20 are securely retained in the tubes 42 of the second connecting portions 40, such as by strong adhesive. Free ends of the levers 12 of the base frame 10 are securely retained in the corresponding tubes 32 of the first connecting portions 30, such as by strong adhesive.

Figure 3:
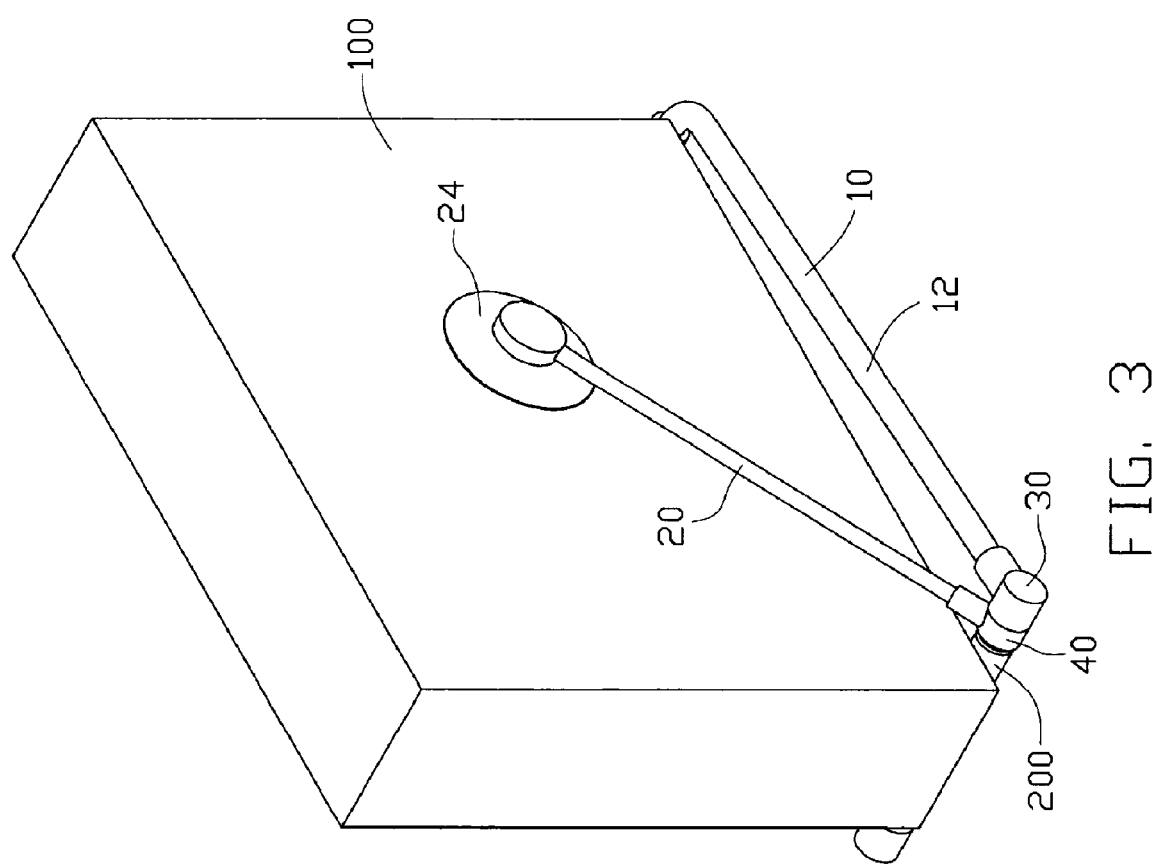
FIG. 3 and FIG. 4 are assembled views of FIG. 1, together with a computer chassis and showing the stand in two working states.
Figure 4:
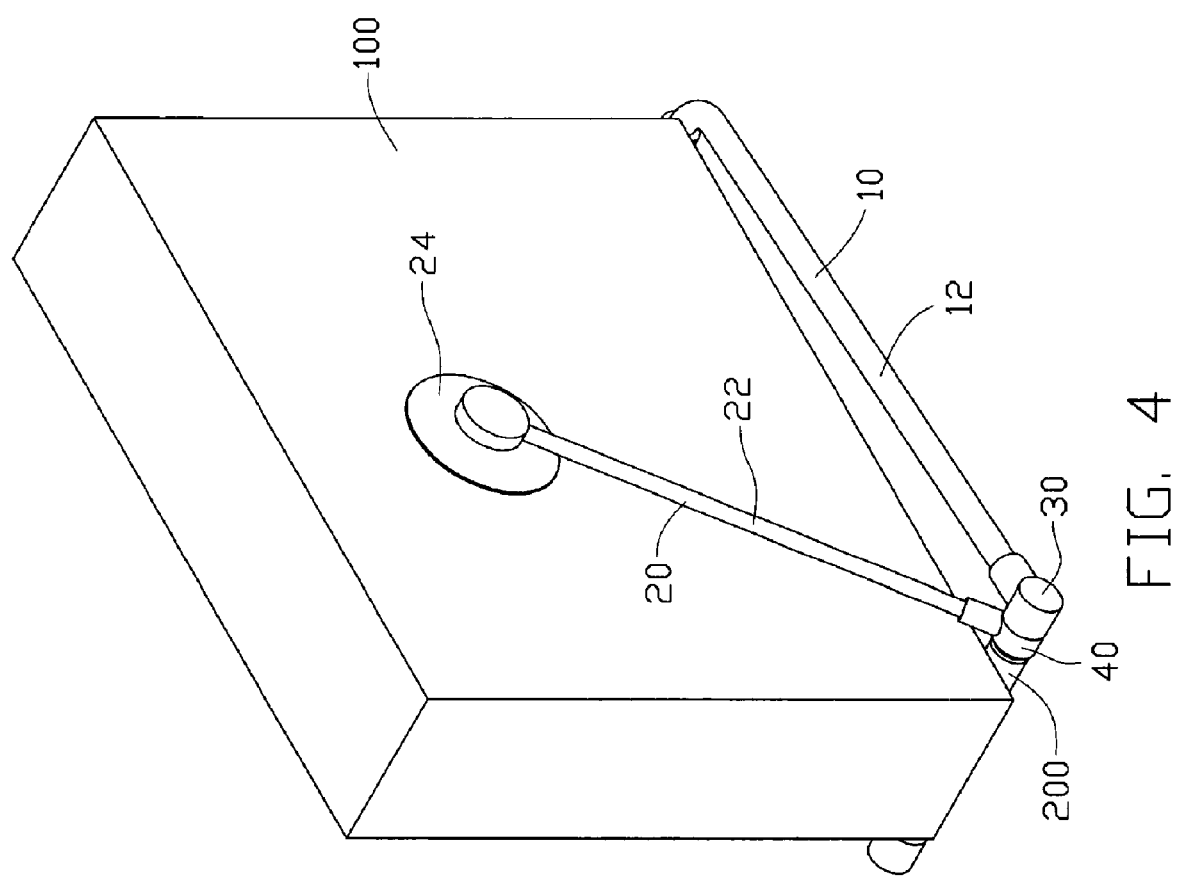

Referring also to FIGS. 3 and 4, in use, two retaining pads 24 sandwiche two sides of the computer chassis 100 therebetween. The beam 14 of the base frame 10 and the shaft 50 of the hinge 3 support a bottom of the computer chassis 100. The arms 20 can be rotated to a fit position to retain a computer chassis with different sizes. The arms 20 can also be rotated to overlap the base frame 10. Therefore, the stand occupies an even less space, which is convenient in transport or in carry.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A stand retaining a computer chassis, the stand comprising:
    a base frame with a pair of levers;
    a pair of clamping arms sandwiching the computer chassis therebetween; and
    a hinge comprising a pair of first connecting portions respectively connecting the levers of the base frame, and a pair of second connecting portions respectively connecting the arms, and a shaft pivotally engaging with the first and second connecting portions, the shaft cooperating with the base frame to support the computer chassis thereon.

2. The stand as claimed in claim 1, wherein the base frame comprises a beam, the pair of levers connecting at two ends of the beam.

3. The stand as claimed in claim 2, wherein each of the first connecting portions comprises a first sleeve, each of the second connecting portions comprises a second sleeve, a collar extends from an end of the first sleeve, the collar comprises a plurality of catches extending through the second sleeve from a first end thereof and engaging with a second end of the second sleeve.

4. The stand as claimed in claim 3, wherein each of the first connecting portions comprises a tube extending from an outer surface thereof for securing a corresponding free end of the levers of the base frame.

5. The stand as claimed in claim 2, wherein each of the second connecting portions comprises a tube extending from an outer surface thereof for securing an end of a corresponding clamping arm.

6. The stand as claimed in claim 2, wherein a plurality of bushes is separately fixed around the beam of the base frame and the shaft between the second connecting portions.

7. The assembly as claimed in claim 3, wherein a slot is defined between each two catches of the collar for providing deformation space to the catches.

8. A stand retaining a computer chassis comprising:
    a base frame seating the computer chassis thereon and comprising a pair of levers;
    a pair of clamping arms sandwiching the computer chassis therebetween; and
    a hinge pivotally combining the clamping arms to the base frame, the hinge comprising a pair of first tubes receiving ends of the levers therein, and a pair of second tubes receiving ends of the clamping arms therein, wherein
    each of the clamping arms comprises a retaining pad at a distal free end thereof away from the second tubes, the retaining pads are spaced from each other for sandwiching the computer chassis therebetween, and the retaining pads together with their clamping arms are pivotable relative to the base frame to allow the retaining pads to be movable along the computer chassis, the hinge comprises a shaft, a pair of first connecting portions fixed around the shaft, and a pair of second connecting portions fixed around the shaft.

9. The stand as claimed in claim 8, wherein base frame has generally a U-shaped configuration and comprises a beam disposed between the levers.

10. The stand as claimed in claim 8, wherein each of the first connecting portions comprises a sleeve fixed around the shaft, the first tube extends from an outer surface of the sleeve.

11. The stand as claimed in claim 10, wherein each of the second connecting portions comprises a sleeve fixed around the shaft, the second tube extends from an outer surface of the sleeve.

12. The stand as claimed in claim 11, wherein the sleeves of the first connecting portions extend to form collars with a plurality of catches to extend through and engage with the sleeves of the second connecting portions.

13. The stand as claimed in claim 8, wherein a plurality of bushes is separately fixed around the beam of base frame and the shaft of the hinge.

14. An assembly comprising:
    an electronic device of said assembly; and
    a stand installable next to said electronic device, and comprising a base frame configured to load said electronic device thereon via a first side of said electronic device so as to supportively maintain said electronic device along a preset orientation thereof, a pair of arms mechanically connectable to said base frame and respectively extending along a pair of second sides of said electronic device other than said first side thereof, said arms each forming a pad at an extending end thereof so as to engage with a corresponding second side of said electronic device and apply a force thereon exclusively via said pad, and disabling movement of said electronic device toward said arms when said pads engage with said second sides of said electronic device respectively, said pads being movable together with said arms relative to said base frame along said second sides of said electronic device to maintain engagement with said second sides so as to vary said force between said pads and said second sides of said electronic device based on a location of said pads relative to said second sides in order for disabling said movement of said electronic device toward said arms, wherein
    said pads are rubber suction portions capable of being stuck to said second sides of the electronic device to position said arms when said pads move to said location thereof relative to the corresponding second sides of said electronic device.

* * * * *